US007965423B2

(12) United States Patent
Glunz

(10) Patent No.: US 7,965,423 B2
(45) Date of Patent: Jun. 21, 2011

(54) FACSIMILE METHODS, APPARATUSES AND SYSTEMS

(75) Inventor: Tom Glunz, Barrington, IL (US)

(73) Assignee: Tom Glunz, Barrington, IL (US)

( * ) Notice: Subject to any disclaimer, the term of this patent is extended or adjusted under 35 U.S.C. 154(b) by 918 days.

(21) Appl. No.: 11/855,612

(22) Filed: Sep. 14, 2007

(65) Prior Publication Data
US 2009/0073499 A1 Mar. 19, 2009

(51) Int. Cl.
H04N 1/04 (2006.01)
(52) U.S. Cl. .... 358/400; 358/1.15; 358/403; 379/100.1; 709/246; 709/204
(58) Field of Classification Search ................ 358/400, 358/442, 402, 1.5, 405, 436, 468; 379/100.1, 379/211.01, 100.08, 100.09, 88.03; 709/246, 709/207, 204, 208
See application file for complete search history.

(56) References Cited

U.S. PATENT DOCUMENTS

| 5,659,732 | A | * | 8/1997 | Kirsch | 1/1 |
| 6,028,679 | A | * | 2/2000 | Murphy | 358/407 |
| 6,058,169 | A | * | 5/2000 | Bramnick et al. | 379/100.01 |
| 6,061,798 | A | * | 5/2000 | Coley et al. | 726/12 |
| 6,335,966 | B1 | * | 1/2002 | Toyoda | 379/100.06 |
| 6,381,313 | B1 | * | 4/2002 | Bashoura et al. | 379/100.14 |
| 6,437,873 | B1 | * | 8/2002 | Maeda | 358/1.15 |
| 6,639,974 | B2 | | 10/2003 | Bashoura | |
| 6,640,248 | B1 | * | 10/2003 | Jorgensen | 709/226 |
| 6,856,431 | B2 | | 2/2005 | Ohta | |
| 6,963,427 | B1 | | 11/2005 | Tanimoto | |
| 7,116,435 | B2 | | 10/2006 | Tanimoto | |
| 7,212,302 | B2 | * | 5/2007 | Toyoda | 358/1.15 |
| 7,215,438 | B2 | | 5/2007 | Chen | |
| 7,394,559 | B2 | * | 7/2008 | Mori | 358/1.15 |
| 7,411,703 | B2 | * | 8/2008 | Adler et al. | 358/442 |
| 7,610,366 | B2 | * | 10/2009 | Wilson, Jr. | 709/223 |
| 7,860,035 | B2 | * | 12/2010 | Onishi | 370/278 |
| 2001/0030760 | A1 | | 10/2001 | Ohta | |
| 2001/0035977 | A1 | | 11/2001 | Adler et al. | |
| 2001/0052999 | A1 | * | 12/2001 | Hiraoka | 358/1.15 |
| 2002/0054371 | A1 | | 5/2002 | Tanimoto | |
| 2002/0116464 | A1 | | 8/2002 | Mak | |
| 2002/0196777 | A1 | | 12/2002 | Wu et al. | |
| 2004/0021896 | A1 | | 2/2004 | Chen | |
| 2005/0275874 | A1 | * | 12/2005 | Rothwell | 358/1.15 |
| 2006/0218267 | A1 | * | 9/2006 | Khan et al. | 709/224 |
| 2007/0268526 | A1 | * | 11/2007 | Ito et al. | 358/403 |
| 2009/0172807 | A1 | * | 7/2009 | Flowers et al. | 726/17 |

OTHER PUBLICATIONS

Int'l Search Report issued in PCT/US08/76228 (2008).

* cited by examiner

Primary Examiner — Negussie Worku
(74) Attorney, Agent, or Firm — Barnes & Thornburg LLP

(57) ABSTRACT

A facsimile method, system and apparatus for sending and receiving facsimiles over one or more networks including a fax sender connected to a network and the PSTN for sending facsimiles, an administrator connected to a network having a processor and at least one database for verifying the identity of the one or more fax receivers and fax senders, at least one fax receiver connected to at least one network for receiving facsimiles wherein the fax sender establishes a connection with the administrator, queries the database to determine the capabilities of the one or more fax receivers, and uses the capability information to send one or more facsimile transmissions to the one or more fax receivers.

18 Claims, 4 Drawing Sheets

```xml
<?xml version="1.0" ?>
<MMFMIdentity SerialNum="123456789" AuthKey="5TH%FG90GE%#N"
  EmailEquivalent="jsmith@testfax.com">
  <ConnectionInfo RequiresFaxServer="True" FaxTo="IPAddress" Country="USA"
      CountryCode="01" FaxNumber="847-555-1234">
    <DNSAddress />
    <EmailAddress>
    - <![CDATA[
    sample@faxsample.com
      ]]>
    </EmailAddress>
  </ConnectionInfo>
  <ConnectionStatus ConnectionDateTime="01/01/2002 23:59:00"
      Bandwidth="128Kb" />
  <Capability Color="False" LetterSizeWidthMax="297" LetterSizeLengthMax="420" />
  <NotAuthorized>
    <SerialNum />
    <IPAddress>
    - <![CDATA[
    32.123.23.158
      ]]>
    </IPAddress>
  </NotAuthorized>
  <OtherInfo VoicePhone="01-847-555-1200" />
  <Log LonOn="True" />
</MMFMIdentity>
```

Fig. 4

FACSIMILE METHODS, APPARATUSES AND SYSTEMS

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

Embodiments of the present invention relate generally to communication systems, and more particularly, to facsimile methods, systems and apparatuses for transmitting and receiving data such as facsimile data over one or more networks, such as the internet.

BACKGROUND OF THE RELATED ART

Facsimile communication methods, systems and apparatuses are used widely for personal and business communications. Facsimile or "fax" machines typically transmit and receive information representing digitized images which may be scanned into the fax machine. These faxed documents are frequently sent over a public telephone network via an internal modem located in the sending and receiving machines.

The features of the aforementioned prior art disclose various configurations that do not provide a facsimile system that can be used both as an internet facsimile machine and as a traditional facsimile machine while at the same time being capable of determining the most economical route or routes for transmitting data across the devices without the sender knowing the capability and characteristics of the receiving fax machine.

SUMMARY OF THE INVENTION

The claimed subject matter includes improved facsimile methods, systems and apparatuses for sending and receiving faxes and other data over one or more networks. These networks include the public telephone network and the internet.

A first embodiment includes a facsimile system for sending and receiving facsimiles over one or more networks including a fax sender connected to a network and the public switching telephone network ("PSTN") for sending facsimiles, an administrator connected to a network having a processor and at least one database for verifying the identity of the one or more fax receivers and fax senders, at least one fax receiver connected to at least one network for receiving facsimiles wherein the fax sender establishes a connection with the administrator, queries the database to determine the capabilities of the one or more fax receivers, and uses the capability information to send one or more facsimile transmissions to the one or more fax receivers.

In another embodiment, the administrator is connected to the internet through one or more firewalls. In another embodiment, the fax sender is a mixed mode facsimile machine which has a liquid crystal display ("LCD") interface for entering phone numbers and/or other relevant information. The LCD interface can be integrated or separate from the facsimile machine being connected wired or wirelessly. In another embodiment, the administrator can provide an authorization code to confirm the identity of the fax sender and the fax receiver.

In other embodiments, the networks used by the system include one or more of the following: a public switching telephone network (PSTN), a wide area network (WAN), a local area network (LAN), a global network, a virtual private network (VPN), an intranet, a wireless network, and a metropolitan area network.

BRIEF DESCRIPTION OF THE DRAWINGS

The accompanying drawings, which are incorporated in and constitute a part of this specification, illustrate several embodiments of the claimed subject matter, and together with the description, serve to explain the principles of the invention.

FIG. 4 is an example of an XML file sent by the MMFM in order to register the MMFM according to a method of the claimed subject matter.

DETAILED DESCRIPTION OF THE EMBODIMENTS

Figure 1:
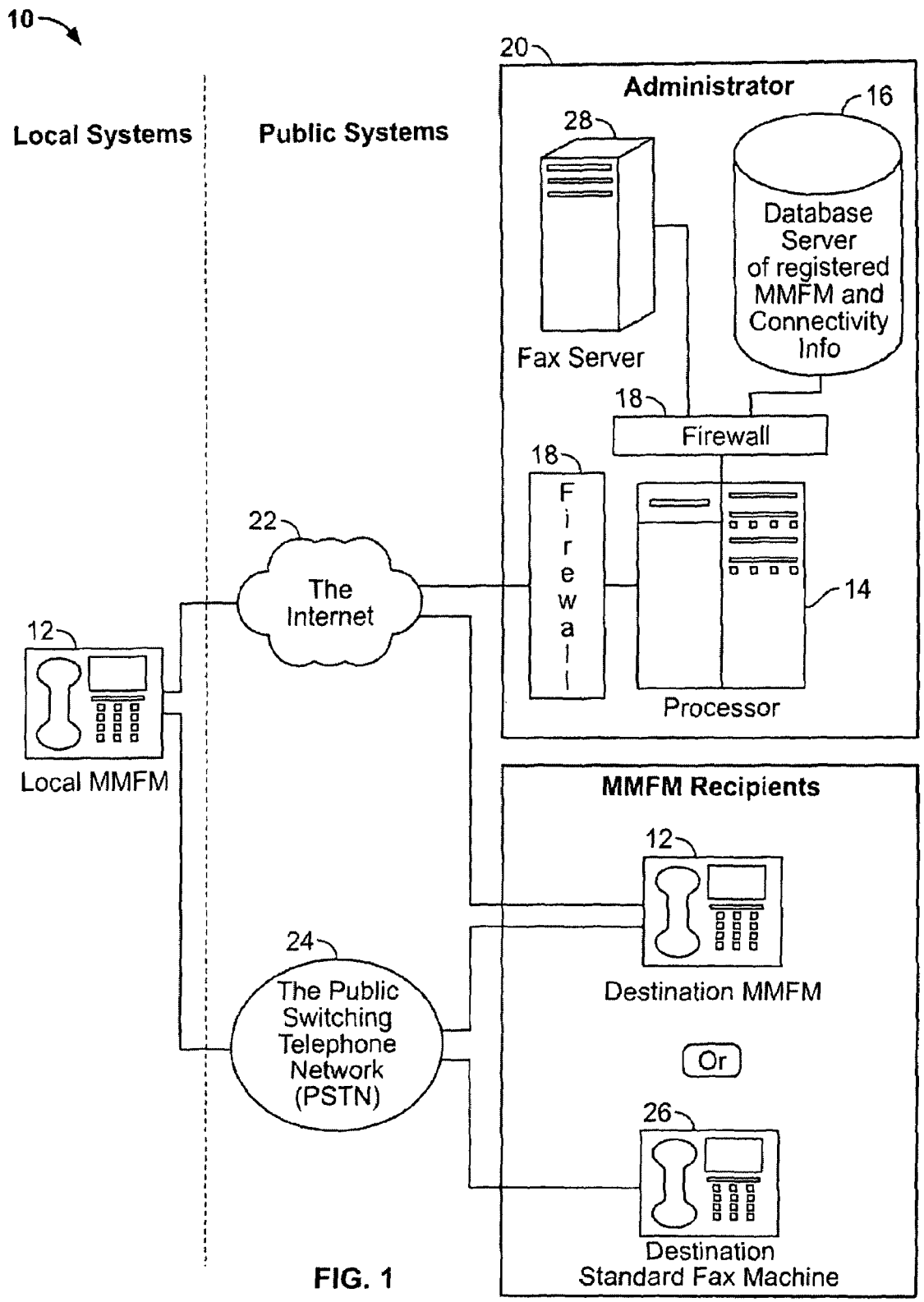
FIG. 1 is a block diagram of a facsimile system and method according to an embodiment of the claimed subject matter.

Embodiments of facsimile apparatuses, methods and systems for sending and receiving faxes are described herein. In the following description, numerous specific details are set forth, such as transactions performed in the context of sending and receiving activities, to provide a thorough understanding of the various embodiments of the claimed subject matter. One skilled in the relevant art will recognize, however, that these embodiments may be practiced without one or more of the specific details, or with other methods, steps or components.

Reference throughout this specification to "one embodiment" or "an embodiment" means that a particular feature, structure, or characteristic described in connection with an embodiment is included in at least one embodiment of the present claimed subject matter. Thus, the appearances of the phrases "in one embodiment" or "in an embodiment" in various places throughout this specification are not necessarily all referring to the same embodiment. The term "or" means "inclusive or" and the words "comprising" and "including" mean "including but not limited to." Furthermore, the particular features, structures, or characteristics may be combined in any suitable manner in one or more embodiments.

Additionally, portions of the described embodiments of the claimed subject matter may be downloaded as computer program product with instructions transferred from a remote computer such as a server over the internet. They may be used in any client/server environment implemented within multiple network architectures such as the World Wide Web.

With reference to the drawings, several embodiments of the claimed subject matter are schematically depicted by flow charts which are representative of a sequence of events and operations performed by or on behalf of the various users/participants involved in sending and receiving of faxes. Each flow chart contains a number of "boxes" identified by reference numbers, which, for ease of discussion, denote an event or operation in one or more of the embodiments. Like reference numerals refer to like elements throughout the several drawing views and flow charts.

The present embodiments use a mixed-mode fax machine 12, also referred to as a MMFM 12, which can be setup and used in a number of configurations and structures. In these embodiments, the facsimile system 10 acts as an internet fax machine as well as a traditional fax machine while determining the one or more efficient/economical routes for transmission of the fax without the sender knowing the capability/character of the destination fax machine. From a user's standpoint, the system 10 will appear to send and receive faxes just as a conventional fax machine does when it sends and receives faxes.

Other embodiments include an interceptor capable embodiment that can be used with one or more existing standard or conventional fax machines. An embodiment that is used as an interceptor capable embodiment could be implemented as a PC board usable with any commercially available computer system or it could be a standalone machine or device that provides an input/output port to a conventional fax machine with one or more network input/output ports.

In several embodiments, facsimiles or any type of data may be sent to one or more recipients using a connection to an existing network such as a local area network (a 'LAN'), a direct computer to computer connection, a public switching telephone network (a 'PSTN' 24), the internet 22 or any combination of these or other networks. Embodiments may also receive and transmit multiple faxes simultaneously, for example by using multiple network connections on one or more network.

With reference to the drawings, wherein like reference numbers refer to like elements throughout the figures, FIG. 1 shows a block diagram of a representative embodiment of a facsimile system 10. The MMFM 12 can send or receive facsimile transmissions using one or more connections to a network such as the internet, a LAN or a PSTN.

As illustrated in FIG. 1, an exemplary MMFM 12 is connected to both the internet 22 and the PSTN 24. The administrator 20 is also shown connected to the internet 22 and it includes a processor 14, a database 16 and optional one or more firewalls 18. The database 16 may be integral to the administrator 20 or it may be a separate standalone information server.

In addition to the internet 22 and the PSTN 24, the MMFM 12 can also communicate over any other known networks including, but not limited to, a wide area network (WAN), a global network, a virtual private network (VPN), an intranet, a wireless network, and a metropolitan area network.

Other embodiments may be used to interface with a standard fax machine 26 which may be any commercially available fax machine that can receive information to be faxed and which can dial a telephone number to send a fax, handshake with a receiving fax machine, and then deliver the fax over the PSTN 24 to the receiving fax machine 26.

In the illustrated embodiment, the administrator 20 may be accessed by the MMFM 12 via the internet 22. The illustrated firewall 18 can be any commercially available hardware, software, or a combination of hardware and software firewalls. Further, any connection used in conjunction with embodiments of the claimed subject matter can use Secure Sockets Layers (SSL) so that any information communication between the various elements is encrypted.

In use, a MMFM 12 acting as the fax sender or transmitter transmits a request, in the form of an XML file, to the administrator 20. The XML file may also be substituted with any other suitable data or data stream. The request informs the administrator 20 that the MMFM 12 will be attempting to transmit a fax. This request may include one or more identifying characteristics of the transmitting MMFM 12 including but not limited to: a machine identifier, the serial identification number, the internal secret security registration code associated with the transmitting MMFM 12, the fax ID of the machine, a fixed or last used setting that informs the administrator 20 of the current characteristics or capabilities of the sending MMFM 12. The administrator 20 may store a number of characteristics for each MMFM 12 device that is registered and the values of each characteristic may be updated or changed from time to time or at any time. For example, the available connection speeds for each registered MMFM 12 may be stored in the database 16. The stored available connection speeds for each device connected to the system may also be updated in instances where an MMFM 12 has a change in its associated connection speed.

Once the request has been received, the administrator 20 queries the database 18 to locate the characteristics associated with the request. These characteristics include the MAC Address and the IP or internet protocol address of the network device that made the request. The database 16 contains all of the associated characteristics and information about each currently connected MMFM 12, as well as each MMFM 12 that has been previously connected and each that has been setup for future connection activities. An example of another type of connection activity include the establishment of communications with one or more MMFM 12 which are newly manufactured but have not yet been registered with the administrator 20. The information contained in the database 16 can be a table and have a large amount of other variables such as an e-mail address associated with a MMFM and other fields containing one or more flags indicating the type of information stored in the fields.

The database 16 is accessible by the administrator 20 typically located behind the internet firewall 18 and arranged so that it can be queried at any time by the administrator 20 for information related to the sending and receiving MMFMs 12. If the database 16 contains a valid registration record such as whether or not the MMFM 12 initiating the request was previously registered, then the transmitting MMFM 12 passes the destination fax number to the administrator 20.

The administrator 20 next queries the database 16 to determine whether or not the destination fax number corresponds to a registered MMFM and, if so, whether or not there are any other characteristics associated with that destination MMFM 12. If values for the characteristics are present, they are passed to the administrator 20, and those values include but are not limited to the I.P. address of the destination MMFM 12. Once a destination MMFM 12 has been authenticated or verified as being a valid destination for the fax transmission, the administrator 20 tests the validity of the connection between the administrator 20 and that destination MMFM 12. If the test is successful, the administrator 20 sends an authorization code to both the sending and receiving MMFMs 12 to signal the initiation of the fax transmission.

Simultaneously, the administrator 20 provides the transmitting MMFM 12 with information on how it can connect to the destination MMFM 12. If the destination MMFM 12 is not a valid or registered MMFM 12, or if the test is not successful, the MMFM 12 can use a dial up phone line on the PSTN 24 to call the destination fax and establish a conventional fax transmission.

Optionally, a fax server 28 may be located behind the firewall 18 for sending and receiving facsimile transmissions, for example a single fax transmission or a multi-destination fax transmission. The administrator 20 can be in communication with the fax server 28 so that it can send instructions to the server 28. Fax server 28 can also store one or more facsimile transmissions, for example facsimiles which are stored in order to be transmitted at a later time or times, and the fax server 28 can manage facsimile transmissions which are being held up at some point in the transmission process and which are temporarily undeliverable to one or more destination MMFMs 12 or to one or more standard fax machines 26. The server 28 can receive, store and send (or resend) undeliverable fax documents and it can assist other fax sending machines with the transmission of facsimile documents to more than one destination facsimile machines. In one example, the sending MMFM 12 passes multiple phone numbers to the administrator 20, which then queries the database 18 for information on each destination MMFM 12. In this embodiment, the administrator 20 then submits this information to the fax server 28 along with the authorization code so that the fax server 28 is authorized to send each of the individual transmissions to the destination MMFMs 12.

Once authorized, the fax server 28 then connects to each of the destination MMFMs 12 so that it can send the facsimile documents. The fax server 28 may also send the one or more facsimile transmissions to one or more traditional fax machines via the PSTN 24. In another embodiment, after a period of time, for example three, four or five minutes, the fax server 28 reports the status of all of the facsimile transmissions back to the administrator 20 and/or the transmitting MMFM 12. The administrator 20 can also send this reporting information to the transmitting MMFM 12 and then the status can be printed or displayed on a display screen. In one example, several receiving MMFM 12's are connected to the internet 22, each of which is registered with the administrator 20, and each receiving a facsimile document from the fax server 28. As previously described, the transmitting MMFM 12 may also send facsimile documents to any standard fax machines 26 which are connected to the PSTN 24. In these embodiments, should any failure occur using the internet 22, the transmitting MMFM 12 can restart the transmission over the PSTN 24. These failures include not locating a valid registration, failures such as a temporary or non temporary internet outage, or any other type of failure.

Figure 2:
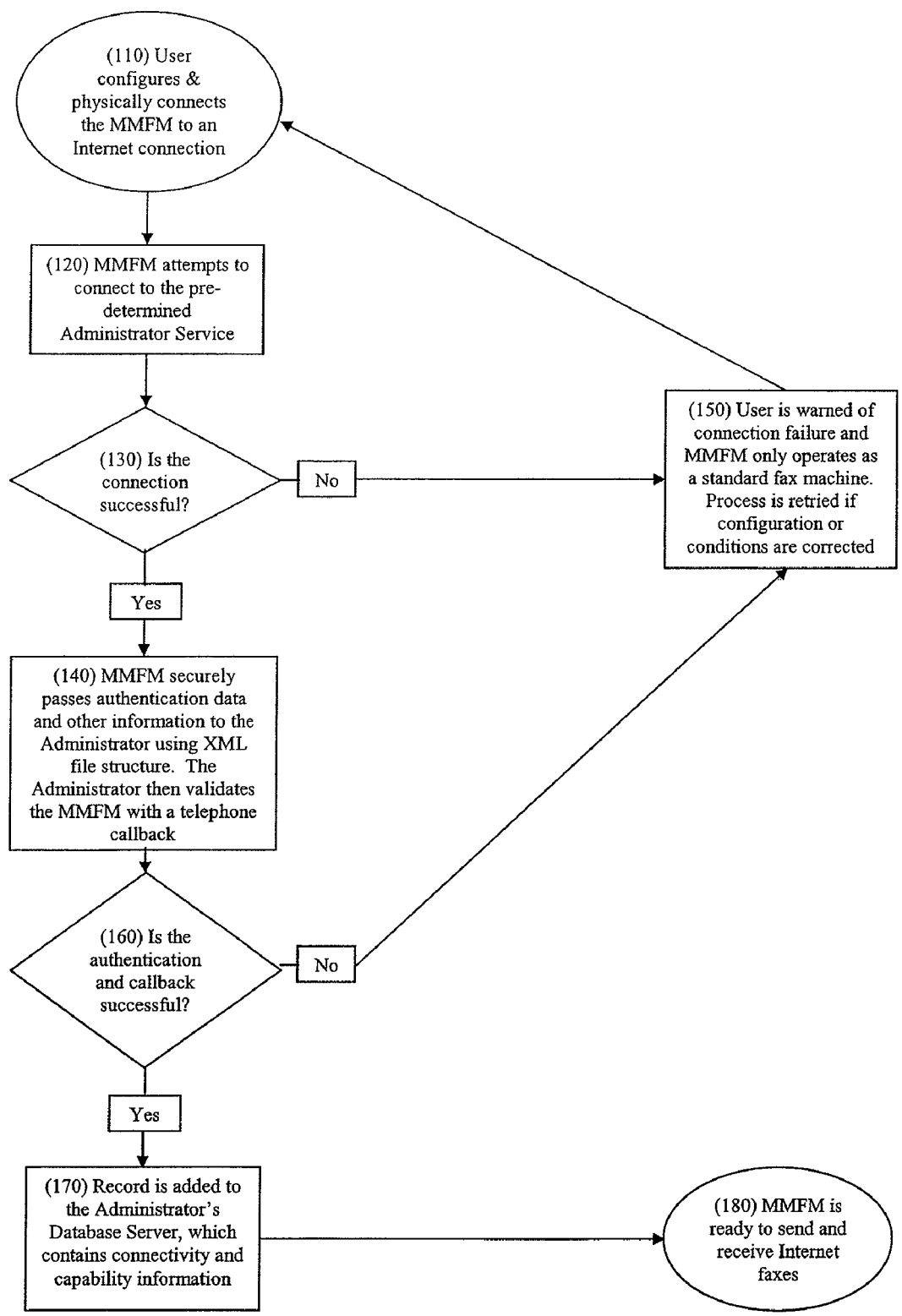
FIG. 2 is a flowchart illustrating the operation of a facsimile system and method in accordance with embodiments of the claimed subject matter.

FIG. 2 is a flow chart diagram illustrating the registration of an exemplary MMFM 12. As shown in step 110, the operator or user of the source MMFM 12 first configures the source MMFM 12 by entering identifying information such as a fax id and/or telephone number. Next, in step 110, the MMFM 12 directs the user to enter or confirm the appropriate area codes and/or country (e.g. telephone country code and other codes as required and depending on the location of the MMFM 12) into the LCD interface of the source MMFM 12. In this step 110 the MMFM 12 or administrator 20 may convert the entered telephone number into a fully qualified international telephone number. The MMFM 12 may also be equipped with a web interface similar to the interface used for configuring consumer broadband routers.

If in the exception the Local Area Network (LAN) does not accept DHCP (Dynamic Host Configuration Protocol) clients, the user will need to also enter the identifying information which may include the IP address, the subnet mask, the default gateway and the DNS server location, into the set-up interface to gain access to the internet 22.

Once completed, step 110 allows the MMFM 12 to register on the administrator 20 with its associated identifying information. This information may include the capability information of the MMFM 12. The capability information may include supported resolution, color depth, transmission speed, and/or any other information related to the capability of the MMFM 12.

In step 120, the MMFM 12 attempts to create a SSL session in order to connect to the administrator 20 and in step 130 it determines whether or not the connection is successful. As shown in step 140, once the connection is found to be valid, the MMFM 12 is authenticated by the administrator 20 by passing the registration information including the MMFM 12 serial number and an encrypted or a secret security code to the administrator 20 using an XML registration file. The serial number along with a secret security code which can be such as an internal number/character sequence which is not available or known to the user of the MMMF 12, must match the corresponding record in the table of manufactured MMFMs 12 found in the database 16 or the MMFM will be not be able to register with the administrator 20.

Additionally, in order to verify that the registering MMFM 12 user is not attempting to intercept another's party's faxes, for example by the entry of a telephone number that does not belong to them, the administrator 20 in step 140 uses a phone line over the PSTN 24 to call back and validate the telephone number submitted as the fax id number during the registration of the MMFM 12. Once the administrator 20 is connected to the MMFM 12 over the PSTN 24, the administrator 20 queries the MMFM 12 for the serial number and secret security code and then authenticates the MMFM 12. If this step is successful, as seen in step 160, the administrator 20 passes an authorization code to the MMFM 12 to authenticate future communications with the administrator 20 and the administrator 20 can then add the new MMFM 12 registration or activate an existing record in the database 16. In another embodiment, the MMFM 12 is able to connect to the administrator 20 at one or more intervals such as a previously specified interval in order to notify the administrator 20 that the MMFM 12 is still to be considered active even though the MMFM 12 may be going through a period of inactivity.

Steps 140 to 160 illustrate a verification process performed by the administrator 20. If the authentication and callback steps in step 160 are successful, the new registration record is added and/or an existing record is tagged as active in the database 16 in step 170 and the MMFM 12 enters the ready state in step 180. The database 16 can store a specified or unspecified number of MMFM 12 attributes such as attributes for authentication, connectivity, capability, and logged information, and these records are created using the link to a unique identifier field created from the main registration record. Once registered, the MMFM 12 is ready to send and receive faxes from both the internet 22 as well as the PSTN 24. Additionally, these steps may be repeated upon certain triggering events, for example if an attribute such as a change in the IP address of a MMFM 12, a period of inactivity for the MMFM 12 such as 7 days (or any another period of time), or upon any other desired triggering event.

If the MMFM 12 is not successful in establishing a connection with the administrator 20, the MMFM 12 user is informed of the reason for the failure and the MMFM 12 subsequently functions only as a standard fax machine 26 until a change to the configuration occurs. If the configuration or status of the MMFM 12 is changed, step 150 is started again in an attempt to establish a connection with the administrator 20. Examples of status or states of the MMFM 12 include: unregistered, registering, failed registration, registration lock-out (such as when there are too many attempts to register), online, forward (such as when a fax is transmitted to another phone number), error or malfunctioning state, and offline (such as when turned off by the user).

Optionally, the administrator 20 may deny or block for a period of time certain addresses such as an I.P. address, range of addresses, or one or more individual MMFMs 12 using the corresponding serial number or phone number if a request for registration is deemed to be invalid or malicious, such as when a machine is malfunctioning or someone is attempting to mock or spoof a machine. In another embodiment, the system 10 may also be used to prevent a MMFM 12 from transmitting an internet fax via TCP/IP without first contacting the administrator 20 or without first authenticating the MMFM 12 via the administrator 20. For example, a blacklist may be used to list every MMFM 12 that has been reported for sending one or more junk faxes or every MMFM 12 that has previously made one or more attempts to send out a large number of unsolicited faxes. In one embodiment, this blacklist may be maintained in the database 16. A local user-created blacklist may also be created, used and stored on the MMFM 12.

Figure 3:
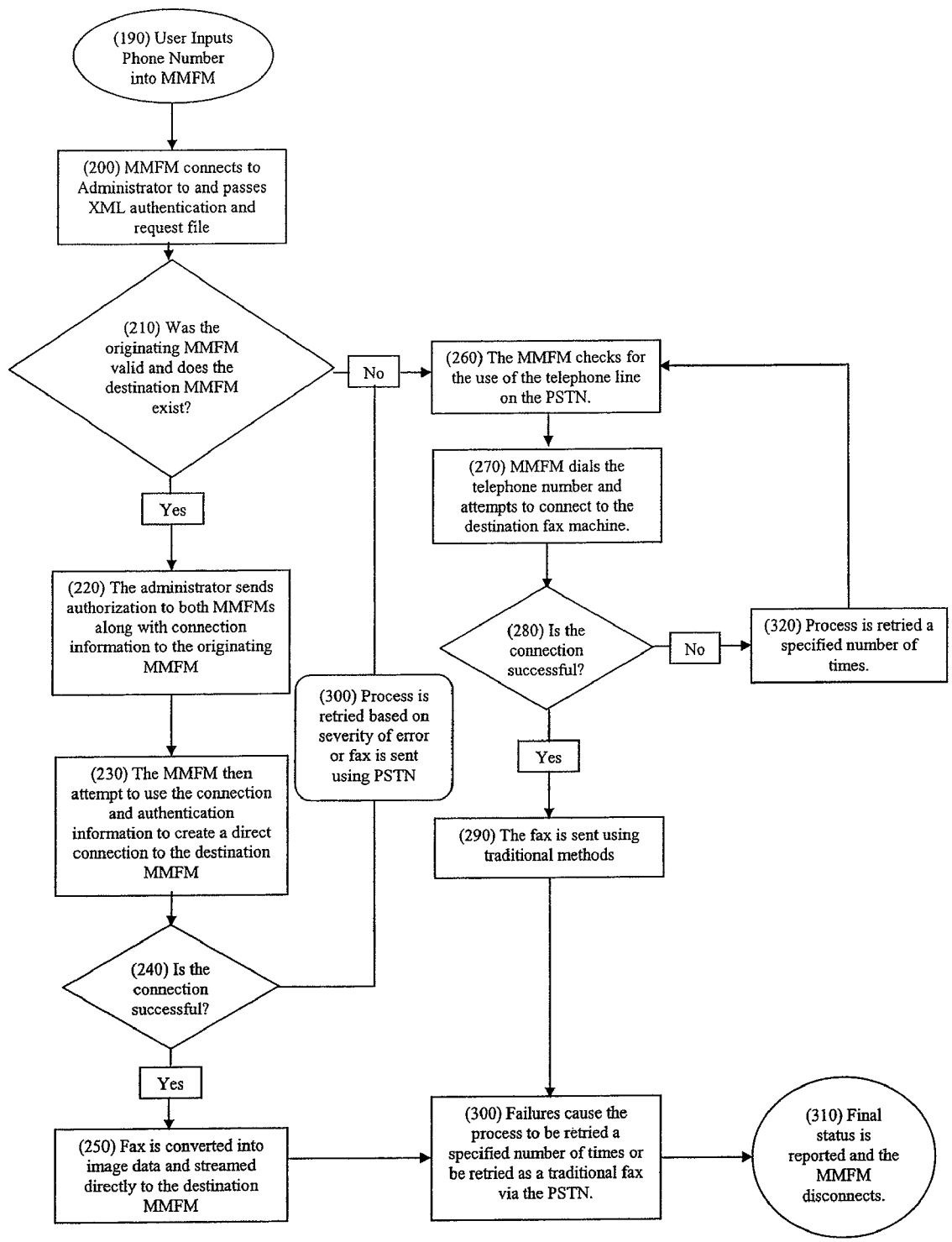
FIG. 3 is a flow chart depicting the operational details of a sending process of a MMFM in accordance with a method of the claimed subject matter.

FIG. 3 is a flowchart showing an example of the process of sending a facsimile by a sending MMFM 12 to a receiving MMFM 12, in one embodiment through the internet 22. For example, as shown in step 190 of FIG. 3, the user first inputs the destination phone number into the sending MMFM 12. Next, in step 200 the sending MMFM 12 attempts to connect to the administrator 20 and passes authentication information along with the receiver's fax phone number. In step 210 the administrator 20 determines whether the sending MMFM 12 is valid or registered and if the receiving MMFM 12 is registered and is available on the internet 22. If any failure occurs or if the receiving fax machine is not registered with the administrator 20 the facsimile transmission is sent over the PSTN 24 as diagramed in steps 260 through 290.

If the administrator 20 verifies the receiving MMFM 12 is registered, the connectivity information, which may include the I.P. address, domain name, sub-domain name, and/or the e-mail address of each connected receiving MMFM 12 along with an authorization code (for example a randomly generated 128-bit code generated and transmitted by the administrator 20) is given to both the sending and receiving MMFMs 12 in step 220. Additionally, one or more codes could also be sent for purposes such as encryption. With this information, the sending MMFM 12 can connect to the receiving MMFM 12 and communicate directly over the internet 22 using the available TCP/IP connections. In step 230 the sending MMFM 12 will attempt to connect and send the authorization code to the receiving MMFM 12 to be verified by the receiving MMFM 12. As previously described, a code generated by the administrator 20 can be used for encryption of the one or more facsimile transmissions helping to prevent unwanted interception by unauthorized parties.

Once connected to the receiving MMFM 12, the sending MMFM 12 attempts to create a direct network connection to the receiving MMFM 12 by first transmitting the authorization code and allowing the receiving MMFM 12 to match the authorization code with the code received from the administrator 20. For example, the sending MMFM 12 sends the authorization code to the receiving MMFM 12. The receiving MMFM 12 verifies the code against the value received from the administrator 20. Once matched, the receiving MMFM 12 accepts the transmission from the sending MMFM 12. The authorization code may include the IP address or the IP address may also be transmitted separately along with one or more other codes. The authorization code may be any combination of one or more codes, such as an authorization code and another type of code. The administrator 20 may send one or more other codes to the MMFMs 12 for other purposes such as encryption.

For example, the administrator 20 may pass an encryption code to each of the MMFMs 12 using a secure connection prior to the transmission of the facsimile document. Both MMFMs 12 would then use the encryption code for the transmission to encrypt the transmitted information. The encryption code could expire once the transmission ends. Any other encryption technique known in the art may be used instead of or in addition to the aforementioned encryption technique.

Once the authorization code is matched to the receiving MMFM 12, the establishment of the direct connection between the MMFMs 12 is complete, as shown in step 230. In step 240, the sending MMFM 12 determines whether or not the connection is successful. As previously described, the MMFM 12 may also verify any encryption to complete the private, secure connection. The one or more fax document images (or any other transmitted data) can then be streamed directly from the sending MMFM 12 to the receiving MMFM 12 in step 250.

Should one or more steps fail in the process, such as when the administrator 20 or a MMFM 12 fails to verify the registration of the receiving MMFM 12, the sending MMFM 12 will initiate a fax transmission to the receiving MMFM 12 (or to the standard fax machine 26 if no MMFM 12 was located) via the PSTN 24. In step 310 after the communication is completed the connection is terminated and the report of the transmission is sent to the sending MMFM 12. The report may also be sent to the administrator 20 where it is stored in database 16.

Alternate Embodiments

In another embodiment, a fax transmission or other communication may be initiated by the requesting MMFM 12 to the serving MMFM 12 through the use of the administrator 20 requesting a list of documents or media that are publicly or privately available to the requesting MMFM 12. The requesting MMFM 12 could then initiate a request to acquire one or more of those available documents or media from the serving MMFM 12.

For example, in one embodiment the request from a source MMFM 12 could be displayed on the LCD display of the serving MMFM 12 so that the user of destination MMFM 12 can interact with the requesting MMFM 12. The LCD can be any commercially available LCD internal or external to the MMFM 12. Alternatively, this process can be automated so no user intervention or input is needed for a particular document to be sent back. Examples of user interactions include the approval of the requesting MMFM 12 request, the denial of the request, the delay of the response to the request, the delayed approval of the request or the delayed transmission of the facsimile document in response to the request.

Additionally, standard facsimile documents can be captured and redirected by the fax server 28 to registered users that have indicated they want to receive their facsimile documents by email instead of or in addition to the other methods previously described. In this case, a user's email can also be stored in the administrator 20 and an email can be sent to the user by the administrator 20 when one or more faxes sent to the user are received by the administrator 20.

FIG. 4 shows an example of an XML file that can be used to send to the administrator 20 for registration of the MMFM 12. This request may also be sent by a destination MMFM 12. In this example, the format of the XML file adheres to the XML 1.0 standard, but it may be adapted to any other format. Either the sending MMFM 12, the destination MMFM 12, or the administrator 20, or the fax server 28 may generate one or more XML files, which can be sent or received with faxes or other data. For instance, an XML file can be sent by the sending MMFM 12 with the XML file containing information which authenticates the file transmission or the facsimile transmission.

In another example, the XML file sent by the transmitting MMFM 12 may contain information about the destination MMFM 12, the connection or connections to be used, the connection status, whether or not the fax server 28 is being used or required to be used, the capability of each MMFM on the system, the serial numbers of one or more of the devices and equipment in use, a time and date stamp, and/or the one or more authorization codes. As previously mentioned, the XML file format is only one example of a flexible file format that can be used with embodiments of the claimed subject matter. Should it be desired, any other file format known to those skilled in the art may be used.

In another embodiment, the MMFM 12 accepts a document for transmission from other sources other than the built in scanner. For example, the MMFM 12 may connect to an internal or an external computer via USB or firewire interface. Additionally a computer may be connected to the MMFM via a wireless connection such as a wireless Ethernet connection, an infrared connection, a blue tooth connection, a ZigBee based connection, or a Zwave based connection. Once a computer is in communication with an MMFM 12, the MMFM 12 can act as a printer and/or accept files from the computer in order to transmit the file via fax. In these embodiments, the MMFM 12 can convert the data received from the computer into a format suitable for facsimile transmission if the data is not in a suitable format.

The computer may also provide the telephone number for the MMFM 12 to attempt or it may require user intervention using an LCD interface or any other suitable type of user interface. The MMFM 12 may also use a wired or wireless communication method to accept documents or data for transmission from other devices, for example mobile telephones, PDAs, digital cameras, or any other device capable of transmitting suitable data.

In other embodiments, the MMFM 12 may include an interface for portable memory devices. For example, the MMFM 12 can have one or more interfaces for compact flash cards, memory sticks, and/or other types of secure digital media devices. The MMFM 12 may also use a USB interface for USB storage devices such as flash memory drives and portable hard disk drives. Other embodiments of the MMFM 12 include a user interface which allows a user to browse file structures stored in the MMFM 12 or stored in other locations. In other embodiments, the user may use the interface to select documents for further action or modification.

IN USE Stand Alone Embodiment with an LCD Interface:

In another embodiment, the MMFM 12 includes the capabilities and features of a standard fax machine 26 as well as a LCD interface that allows a user to interact with the system 10 or the sending MMFM 12. As previously described, the user may also interact with the receiving MMFM 12. In this embodiment, the user submits information including the telephone number associated with the MMFM 12 into the input panel of the LCD interface during the initial setup of the MMFM 12. This number may also be subsequently converted to a fully qualified international phone number by the MMFM 12 or by the administrator 20.

The user can use the LCD panel to add other information to the MMFM 12. This information may include the name of the user and the company name to use as the fax identifier. Next, the MMFM 12 establishes a connection to the administrator 20 and, using an SSL connection, submits an XML file or similar data stream to the administrator 20 which stores the information in database 16. The administrator 20 may also provide an authorization code to the MMFM 12, which would be used by the MMFM 12 when it transmits new information to the administrator 20 such as when the MMFM 12 is initiating a fax transmission, a change in IP address or a change in the phone number associated with a MMFM 12. Additionally, any time a new phone number is used in conjunction with a MMFM 12, a callback from the administrator 20 could be required to verify the new phone number as being associated with the MMFM 12.

In this embodiment, a callback can be required by the system and/or the user of the system. This callback can be required each time, at specific times, more than one time, or at a single time. Here, the requesting MMFM 12 attempts to establish a connection with the administrator 20. Administrator 20 receives the MMFM 12 identifying information (from the MMFM 12) and then the administrator 20 calls back the MMFM 12 using the PSTN 16 to confirm that the MMFM 12 was the originating MMFM 12. The call back from the administrator 20 may also be over another or alternate network. Once the identity of the MMFM 12 is confirmed by the administrator 20, the administrator 20 passes or sends an authorization code to the MMFM 12 so that the authorization code may be used for the current as well as one or more subsequent communication sessions. In this way, the MMFM 12 setup is complete after the callback from the administrator 20 as the MMFM 12 is now registered with the administrator 20 and ready to send or receive facsimile transmissions.

MMFM 12 setup is complete as it is registered with the administrator 20 and ready to send or receive facsimile transmissions.

In this embodiment, when a transmitting MMFM 12 attempts to reach a destination MMFM 12, it sends a request to the administrator 20 which will first validate the transmitting MMFM 12. This request may be the international telephone number supplied by user of the sending MMFM 12 or it may be a request that is interpreted and converted by the administrator 20 to a destination address using the available information in database 16. The administrator 20 next responds to the request and authorizes a direct network connection between the sending MMFM 12 and the destination MMFM 12. Once the initial contact is established, the sending MMFM 12 passes the authorization code to the destination MMFM 12 during the handshake step. In this embodiment, the handshake step may include one or more encryption steps and/or the use of an encryption method known to those skilled in the art. The authorization code may be provided by the administrator 20 in order to authorize the establishment of the connection, any subsequent communication and/or the transfer of the data through the network.

In an interceptor embodiment, the MMFM 12 can be interfaced with a standard fax machine 26, which can be any type of commercially available fax machine or PC component for instance that acts as a fax machine. Standard fax machines 26 typically seizes the telephone line used by taking the line "off-hook" and receiving the dial tone generated on the line. Most of these standard fax machines 26 will test the connected phone line for the presence of the dial tone before they send a fax. Once a dial tone is detected, the local fax machine then dials the receiving fax machine 26 phone number and if successfully connected, transmits the fax.

In the interceptor embodiment of the claimed subject matter, the fax machine 26 is connected to a phone line inlet/outlet of the MFMM 12 and not directly to a telephone line. The interceptor embodiment may also include an off-hook sensor which senses when the fax machine 26 is in an "off-hook" state, for example by sensing a low impedance state on the phone line. Once the "off-hook" state is detected, the MMFM 12 provides a dial tone to the sending fax machine 26, after which the sending fax machine 26 dials the phone number corresponding to the destination fax machine 26.

Upon receiving the dialing information from the fax machine 26, the interceptor embodiment decodes the destination telephone number and sends the fax in accordance with a previously described embodiment. Similarly, one interceptor embodiment of the claimed subject matter can connect directly to a fax machine 26 via a phone line inlet/outlet of the MFMM 12 and generate an outgoing fax that can be received by the fax machine 26 through the phone line connection. The connection to the interceptor embodiment may be connected via a standard phone line or it may be connected through any known means such as through a wireless connection using one or more known or commercially available wireless communication devices.

In another embodiment, an optional feature may be used whereby an email address may be entered into the LCD interface of the MMFM 12 and submitted to the administrator 20. This could be used as a back-up during a period where the MMFM 12 is unavailable due to a condition like a power outage or printer malfunction. Additionally, the MMFM 12 may accept a standard fax transmission (one from a standard or conventional fax machine.) The received fax could then optionally be sent to the administrator 20 where it could be formatted and sent via email to the associated destination email address.

In another embodiment, an additional step is included to verify the destination address so that the fax being sent will not be sent to an incorrect recipient. The fax machine 26 would query the database 16 to verify the validity and identity of the recipient's fax machine 26 before the fax is transmitted to the receiving fax machine 26. The identity of the destination MMFM 12 could be displayed on the LCD interface so that the user could view the confirmation and enable the MMFM 12 to continue with the facsimile transmission.

Data:

The data of the sending and receiving can be stored, compiled and used for statistical analysis. These uses include analyzing fax usage patterns and fax economic predictions.

For example, the sending and receiving data for a specified time period may be shared with third party providers wishing to target market users in demographic regions or who send or receive certain volumes of transmissions. The data may also be used to determine the most efficient time to send a fax over a specified network based on the statistical analysis of delivery times found in the stored data.

While the claimed subject matter has been described with referenced to multiple embodiments, it should be understood by those skilled in the art that various changes and modifications may be made and equivalents may be substituted for elements thereof without departing from the scope of the claimed subject matter. Therefore, the claimed subject matter is not limited to the various disclosed embodiments including the best mode contemplated for carrying out the claimed subject matter, but instead includes all possible embodiments falling within the scope of the appended claims.

What is claimed is:

1. A facsimile system for sending and receiving facsimiles over one or more networks comprising:
a fax sender and at least one fax receiver connected to at least one network for sending and receiving facsimiles;
an administrator connected to the same at least one network to which the fax sender and fax receiver are connect, the administrator having a processor and a collection of data for verifying the at least identity of the one fax receivers and the fax sender; and
wherein the fax sender establishes a connection with the administrator, queries the collection of data to determine the characteristics of the fax receivers, retrieves the capability information associated with the at least one fax receiver, and the fax sender uses the characteristics to send one or more facsimile transmissions to the at least one fax receiver.

2. The facsimile system of claim 1 wherein the network includes one or more firewalls.

3. The facsimile system of claim 1 wherein the administrator provides a security code to confirm the identity of the fax sender and the fax receiver.

4. The facsimile system of claim 1 wherein the network is selected from the following: a public switching telephone network (PSTN), a wide area network (WAN), a local area network (LAN), a global network, a virtual private network (VPN), an intranet, an internet, a wireless network, and a metropolitan area network.

5. The facsimile system of claim 1 wherein the fax sender sends a data stream to the administrator in order to register with the administrator.

6. The facsimile system of claim 1 wherein the fax receiver sends a data stream to the administrator in order to register with the administrator.

7. The facsimile system of claim 1 wherein the fax sender sends a data stream containing a serial number and registering security code to validate the fax sender and facsimile number of the fax receiver to the administrator in order to make a request to transmit facsimiles, and wherein the administrator provides the fax sender with information on how to establish a connection with the fax receiver so that the fax transmission can be initiated.

8. The facsimile system of claim 1 wherein the administrator sends the fax sender and the fax receiver a data stream containing connection information to be used by the fax sender and the fax receiver.

9. The facsimile system of claim 8 wherein the connection information includes one or more selected from the following group: an authorization or other type of code, information about how the fax sender can connect to the fax receiver, information about how the destination will accept the connection from the fax sender, and information about the characteristics and use of an encryption code.

10. The facsimile system of claim 1 wherein the collection of data is made up of a plurality of databases.

11. The facsimile system of claim 10 wherein said plurality of databases further comprise a fax server service for providing the management of one or more facsimile documents needed for storing and sending facsimiles that are currently undeliverable or for deferred delivery and/or for multi-location destination as deemed in the destinations corresponding registration record(s).

12. The facsimile system of claim 1 wherein the collection of data contains one or more current or past information attributes associated with a fax sender or a fax receiver selected from the following group: a manufacturer name of the fax device, a manufactures model of the fax device, a phone number associated with the fax device, an IP address, a serial number, a security code, and any other fax device related attributes.

13. The facsimile system of claim 1 wherein the administrator receives and stores one or more of the following characteristics: a fully qualified international phone number, a MAC address, an I.P. address of the fax sender, an authorization code, a secret code, and a serial number of the fax device sending or receiving.

14. The facsimile system of claim 1 wherein upon failure the fax sender sends the facsimiles to the fax receiver over a public switching telephone network.

15. The facsimile system of claim 1 wherein upon a registration request from a fax machine, the administrator contacts the fax machine via a public switching telephone network to confirm the identity of said requesting fax machine and, once confirmed, to transmit a security code which the fax machine can use to initiate subsequent communication with the administrator.

16. A method of sending and receiving facsimiles over one or more networks using a fax sender connected to a network and a PSTN comprising the steps of:
   establishing a connection with an administrator wherein the administrator is connected to a network and wherein the administrator comprises a processor and at least one collection of data for verifying the identity of the one or more fax receivers and fax senders;
   querying the collection of data to determine characteristics of the one or more fax receivers with at least one fax receiver being connected to at least one network for receiving facsimiles; and
   sending one or more facsimile transmissions to the one or more fax receivers using the characteristics.

17. An apparatus for sending and receiving facsimiles over one or more networks comprising:
   at least one fax sender;
   at least one fax receiver; and
   at least one administrator having a processor and a database for verifying the identity of the one or more fax receivers and fax senders;
   wherein a fax sender:
   establishes a connection with one or more administrators;
   queries the one or more collections of data to determine the capabilities of the one or more fax receivers;
   retrieves characteristics of one or more the destination fax receivers from at least one administrator; and
   sends one or more facsimile transmissions to the one or more fax receivers using the retrieved capability information.

18. The facsimile system of claim 17 wherein upon a registration request from a fax machine, the administrator contacts the fax machine via a public switching telephone network to confirm the identity of said requesting fax machine and, once confirmed, to transmit a security code which the fax machine can use to initiate subsequent communication with the administrator.

* * * * *